May 30, 1967 B. R. PELLY 3,323,076

RELAXATION INVERTER CIRCUIT ARRANGEMENT

Filed March 6, 1964 8 Sheets-Sheet 6

United States Patent Office 3,323,076
Patented May 30, 1967

3,323,076

RELAXATION INVERTER CIRCUIT ARRANGEMENT

Brian Raymond Pelly, King's Cross, London, England, assignor to Westinghouse Brake and Signal Company, Limited, London, England Filed Mar. 6, 1964, Ser. No. 349,967
Claims priority, application Great Britain, Mar. 26, 1963, 11,882/63
11 Claims. (Cl. 331—117)

This invention relates to inverter circuits and relates in particular to relaxation inverter circuits.

Relaxation inverter circuits have been proposed in which the capacitor is charged via an inductance from a direct current supply source, an oscillatory discharge of this capacitor being intermittently effected through an oscillatory load circuit via a controllable rectifier device. Inverter circuits operating on this basis may have shortcomings especially when they employ semi-conductor controllable rectifiers in that the maximum operating frequency is limited by the recovery time of the controllable rectifier device or devices employed. The recovery time is the period of time immediately following the conducting period during which reverse bias must be applied to the controlled rectifier, so that, when forward bias is subsequently re-applied to the rectifier, it does not revert to the conducting state until a further control signal is applied to it.

With a view to reducing the above shortcomings the present invention provides a relaxation inverter circuit arrangement having switching means for intermittently charging a capacitor from a current supply source, and switching means intermittently operable to connect said capacitor to an output circuit for the resonant transfer of energy to the output circuit.

It is a feature of the present invention that the frequency in operation of the switching means to connect the capacitor to the output circuit can be less than the tuned frequency of the output circuit. Hence even though upper frequency limitations may be placed on the switching devices, these limitations are not imposed on the output frequency of the circuit.

In one modified aspect of the invention the oscillatory output circuit is arranged to receive bursts of energy from a plurality of capacitors in turn by cyclic operation of a plurality of switching means. In this way upper frequency limitations are still further removed.

As will be seen hereafter, it is proposed as a further feature of the invention that intermittent bursts of energy shall be supplied in different directions to the load circuit such that the mean direct current component therein is substantially zero. This can be achieved, for example, by feeding the output circuit in push-pull fashion or by deriving the energy from a centre tapped supply. By operating the invention in this manner certain advantages may be obtained when an output transformer is employed.

In order that the invention may be clearly understood and readily carried into effect the same will be further described by way of example only with reference to the accompanying drawings.

Figure 1:
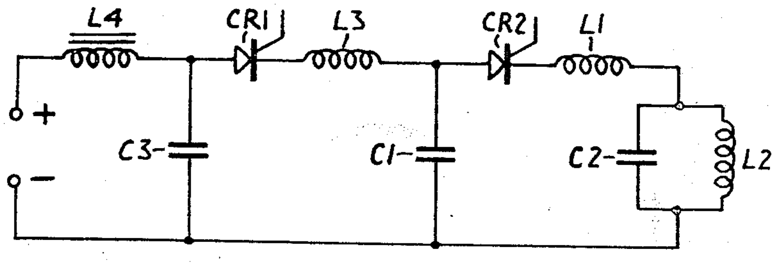
Figure 3:
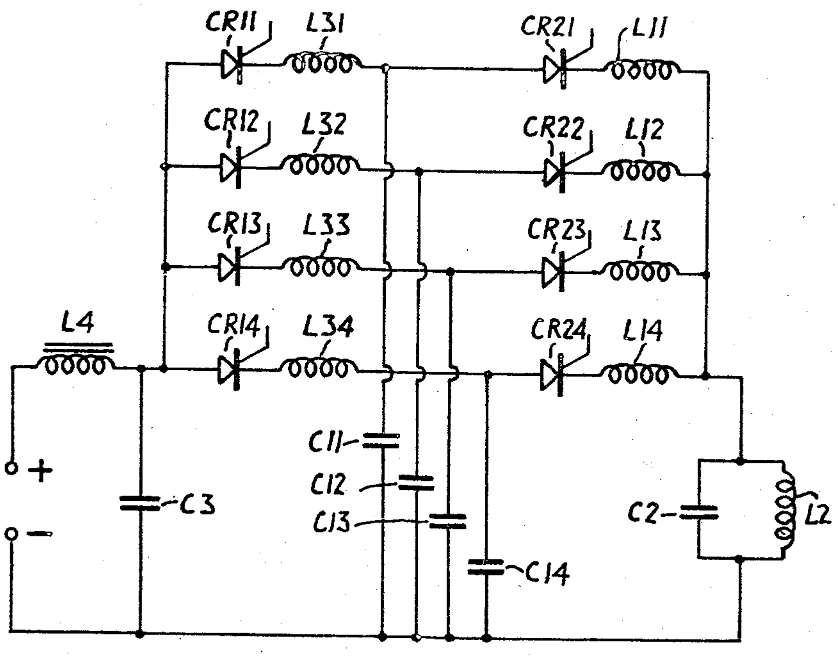
Figure 2:
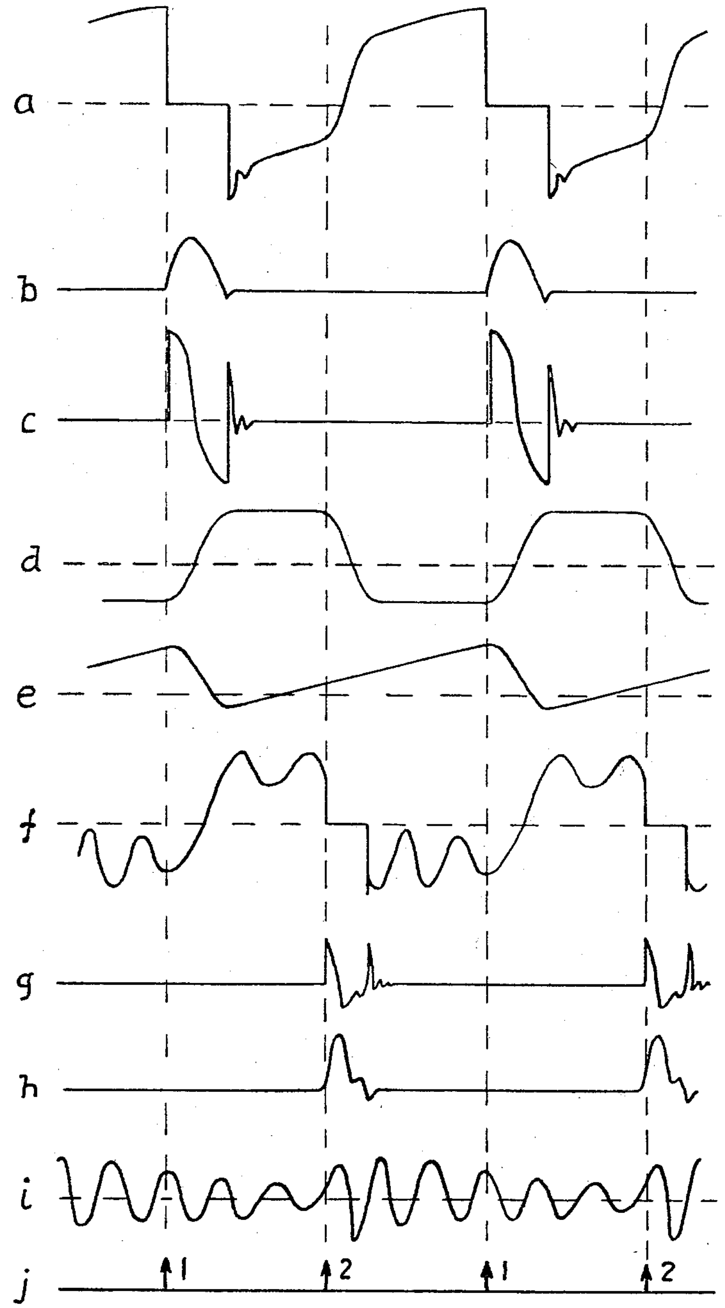
Figure 4:
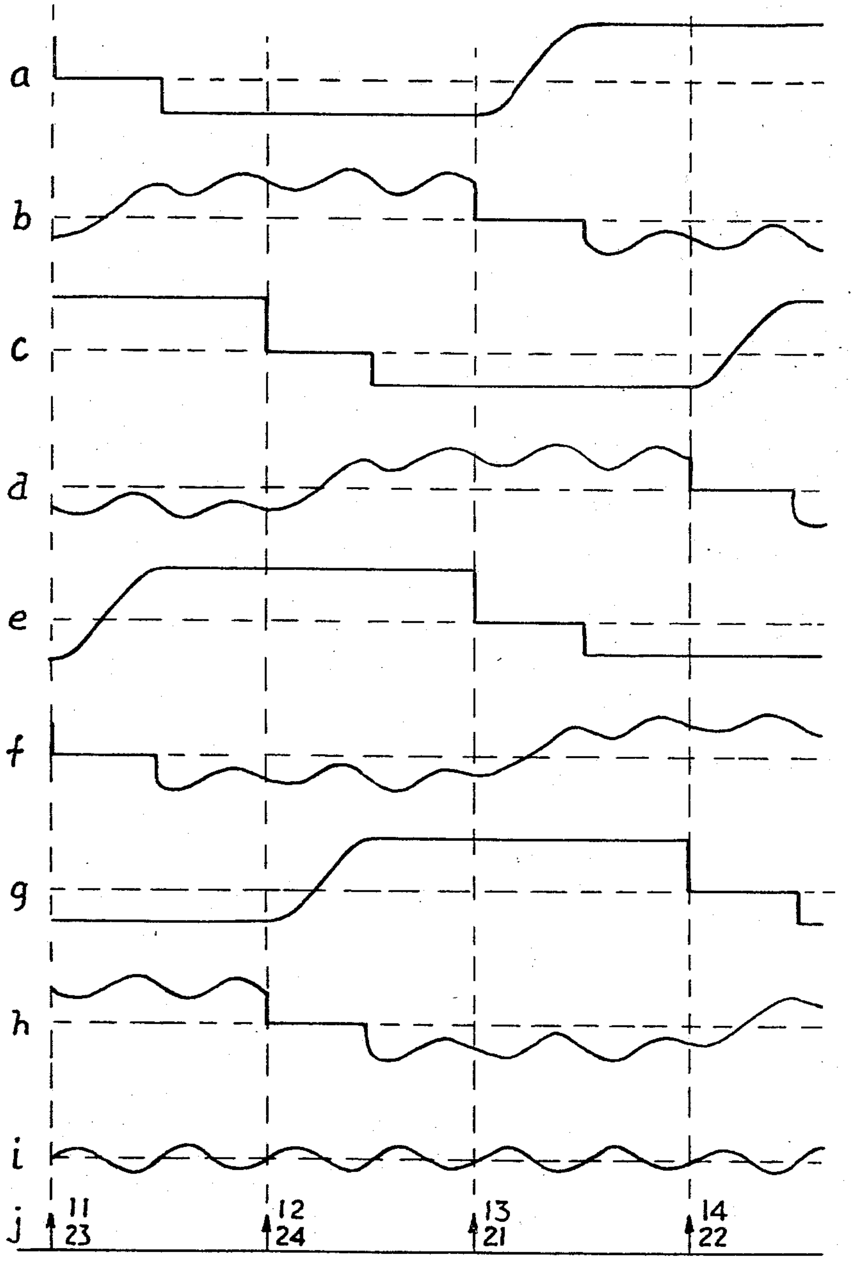

FIG. 1 illustrates in diagrammatical form one form of circuit arrangement employing the present invention, FIG. 2 illustrates wave-forms to be referred to in the discussion of the operation of FIG. 1, FIG. 3 illustrates a further circuit arrangement employing the present invention and FIG. 4 illustrates waveforms to be referred to with reference to the circuit arrangement of FIG. 3.

Figure 5:
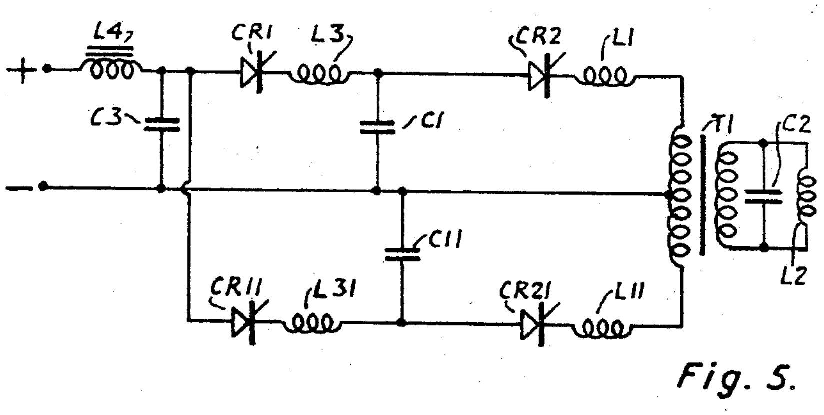
Figure 6:
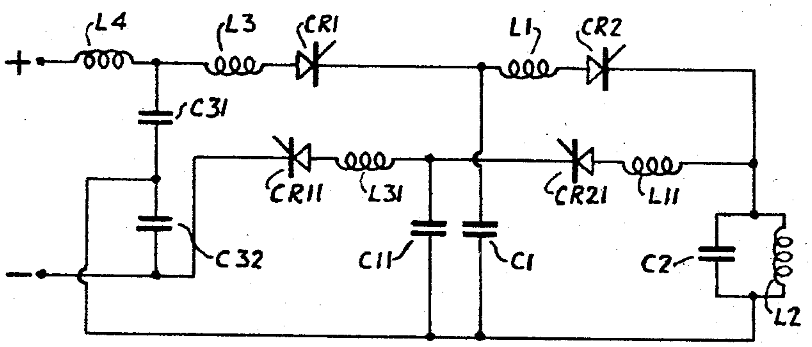
Figure 7:
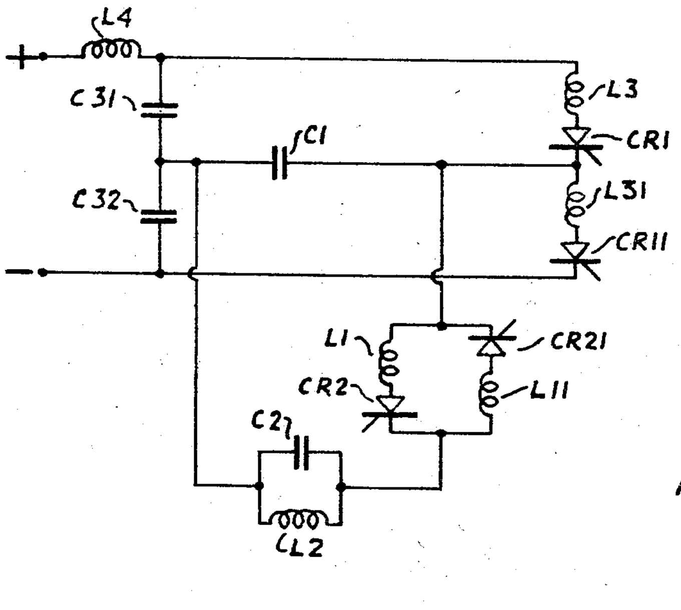
Figure 8:
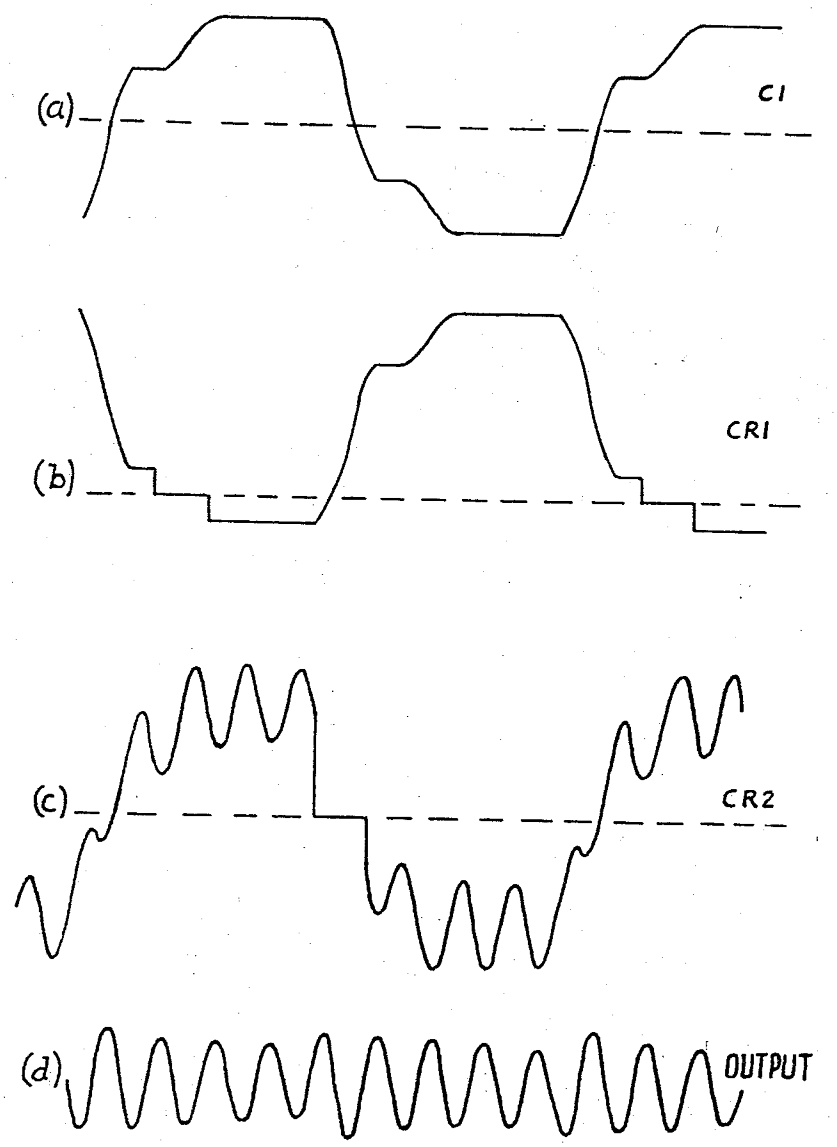
Figure 9:
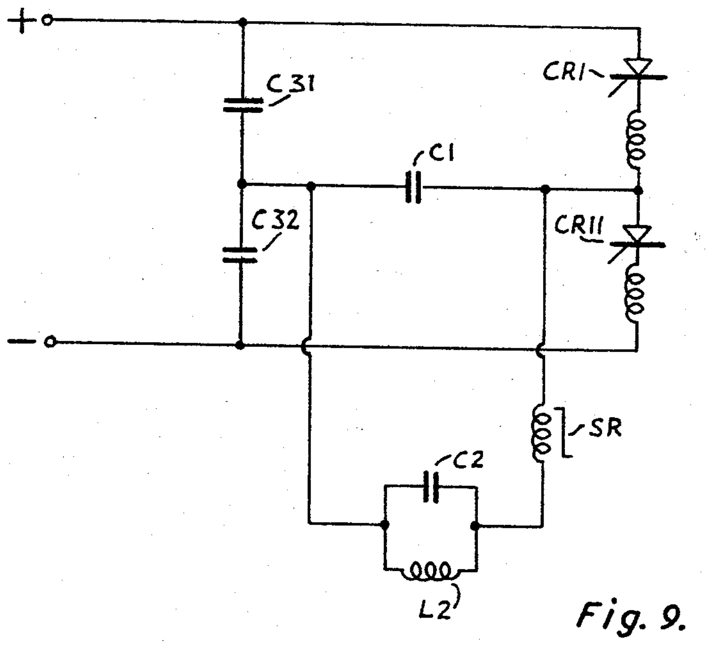
Figure 12:
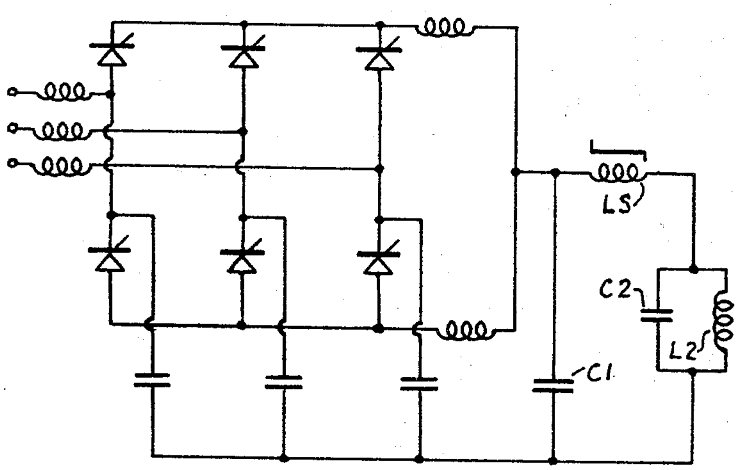
Figure 10:
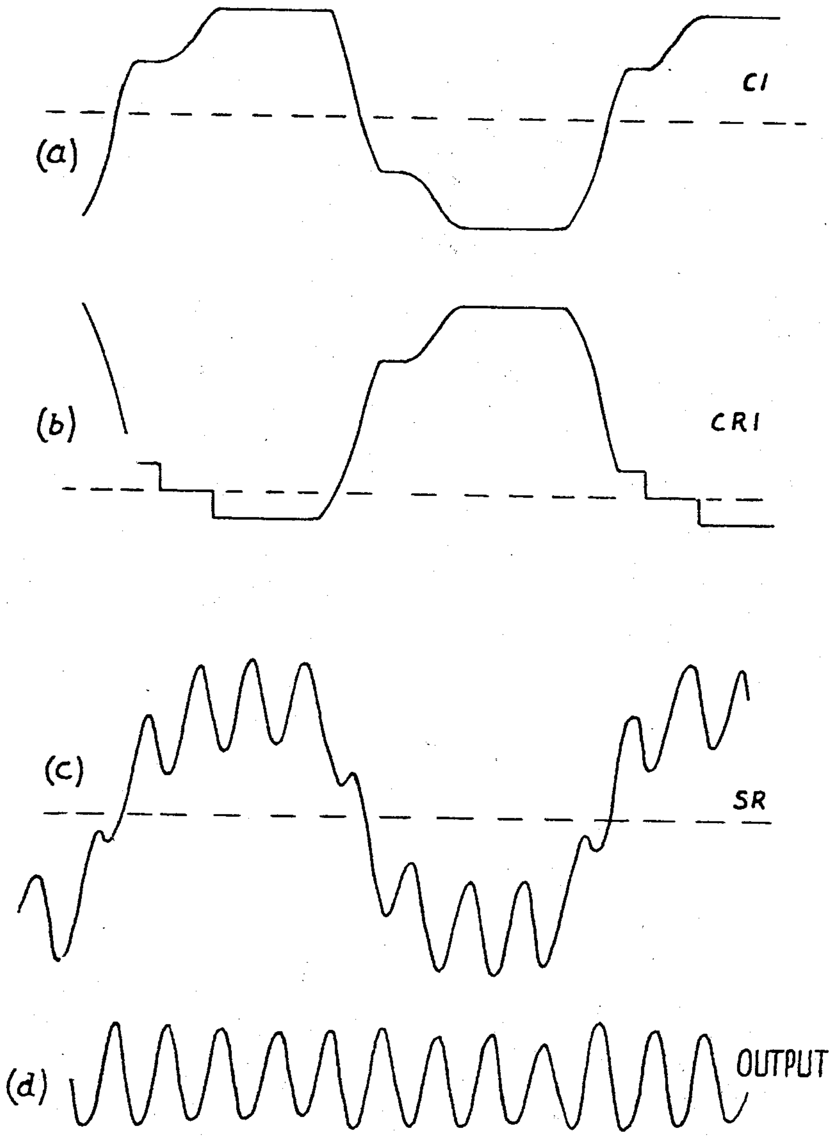
Figure 11:
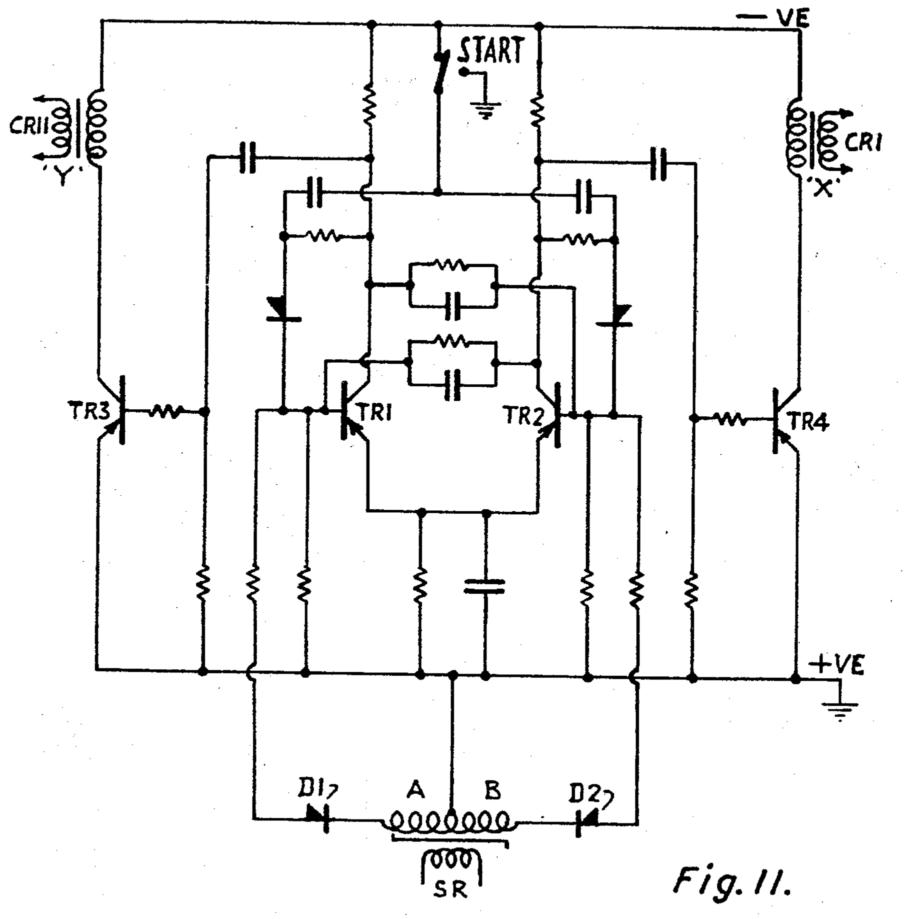

Reference will also be made to the accompanying drawings which for convenience are numbered 5 to 11 and of which, FIG. 5 illustrates a modification of the circuit of FIG. 1 to give push-pull operation, FIG. 6 illustrates a modification of the circuit of FIG. 1 employing a centre-tapped supply, FIG. 7 illustrates a further embodiment of the invention employing a centre-tapped supply, FIG. 8 illustrates waveforms illustrative of the operation of the circuit arrangement of FIG. 7, FIG. 9 illustrates a modification of the circuit of FIG. 7 employing a saturable reactor, FIG. 10 illustrates waveforms illustrative of the operation of the circuit arrangement of FIG. 9, FIG. 11 illustrates a control circuit for use in conjunction with the circuit arrangement of FIG. 9, and FIGURE 12 illustrates a circuit arrangement for converting a three phase supply and based on the circuit arrangement of FIGURE 9.

Referring to FIG. 1, a switching means in the form of a controllable rectifier device CR1 has its "anode" connected to the positive terminal of a direct current supply source, which is not shown, via the inductance L4 of an input filter made up of L4 and a capacitor C3. The "cathode" of CR1 is connected to one terminal of an inductance L3. The other terminal of L3 is connected to one terminal of a capacitor C1 and also to the "anode" of further switching means in the form of a controllable rectifier device CR2 which has its "cathode" connected via an inductance L1 to a parallel arrangement of an inductance L2 and capacitor C2. The other terminal of this parallel arrangement is connected both to the other terminal of C1 and to the negative terminal of the direct current supply source. In a typical circuit arrangement the value of L3 is approximately twice that of L1 and the value of L1 is approximately twice that of L2. The capacitor C1 moreover is approximately equal to half the value of the capacitor C2. In the present arrangement as will be seen hereafter, the values of L2 and C2 may be so chosen that the natural oscillatory frequency of the parallel arrangement of these two components is so high that a number of oscillations thereof may occur whilst CR2 is still in the process of being turned off. It will be understood that in certain applications of the inverter circuit of FIG. 1, L2 may in fact comprise the load and in certain other applications the load may be connected across L2, in which case, it will be understood that the oscillatory frequency may be modified by the presence of the load.

The controllable rectifier means CR2 and also CR1 in the present embodiment each comprise semi-conductor devices of a type which are rendered conducting on application of a triggering signal thereto and are subsequently rendered non-conducting when the current therein tends to reverse. However, these devices have a definite recovery time for tuning off before the elapse of which if a forward voltage is again applied, they can begin to conduct again without the application of a further triggering signal.

In operation of the circuit arrangement illustrated in FIG. 1, reference may be made to the graphical illustrations shown in FIG. 2. Referring to FIG. 2(*a*) represents the voltage which appears across the controllable rectifier device CR1, (*b*) illustrates the current wave form through CR1, (*c*) illustrates the voltage appearing across L3, (*d*) illustrates the voltage appearing across the capacitor C1, (*e*) illustrates the voltage appearing across the capacitor C3 of the input filter, (*f*) represents the voltage appearing across the controllable rectifier device CR2, (*g*) represents the voltage appearing across L1, (*h*) represents the current in the controllable rectifier device CR2, (*i*) represents the voltage appearing across the load or across C2L2 and (*j*) indicates the points in the cycle of operation at which the triggering signals are applied to the controllable rectifier devices. At ($j$), the instant at which CR1 is rendered conducting is represented by the numeral 1 and the instant at which CR2 is rendered conducting is represented by the numeral 2.

When the controllable rectifier CR1 is rendered conducting, at an instant 1 as shown in FIG. 2($j$) the capacitor C1 becomes charged resonantly through the filter from the direct current supply via the inductance L3.

The current through CR1 is therefore oscillatory and after half a cycle the current returns to zero as shown in FIG. 2($b$), and attempts to reverse. At this instant the controllable rectifier CR1 becomes non-conducting and leaves the capacitor C1 charged to a voltage which is in excess of the supply voltage. The voltage across CR1 is therefore now a reverse voltage and that across CR2 is a forward voltage. At a later instant represented by the instant 2 in FIG. 2($j$), a triggering signal is applied to the controllable rectifier device CR2 and the capacitor C1 discharges through L1 into the tuned circuit comprising C2 and L2. The current in CR2 is again oscillatory and after a period of time dependent upon the relative values of the circuit components, the current in CR2 tends to reverse and CR2 is rendered nonconducting. The voltage across C1 has now reversed and remains virtually constant at this voltage until the next triggering signal is applied to the controllable rectifier device CR1. The voltage across CR1 is therefore now a forward voltage whereas the voltage across CR2 is a reverse voltage. Since the capacitor C1 has lost a burst of energy to the output circuit comprising C2 and L2, this circuit oscillates at its natural frequency. Furthermore, it is arranged that the peak oscillation voltage in the circuit comprising C2 and L2 is slightly less than the voltage to which the capacitor C1 is charged at the instant at which CR2 becomes non-conducting hence throughout the period between the instant at which CR2 becomes non-conducting and that at which CR1 is again rendered conducting, during which the load circuit may complete several cycles of oscillation, the voltage across CR2 is always a reverse voltage. Hence controllable rectifier means CR2 is maintained reverse biased to a valve which is not overcome by the oscillatory voltage in the output circuit and there is no tendency for CR2 to become conducting again. When the next triggering signal is applied to CR1, capacitor C1 is charged again from the supply source and the voltage across CR2 as seen in FIG. 2($f$), moves into the forward direction, whereas that across CR1, as seen in FIG. 2($a$), is reversed at the instant at which this controllable rectifier becomes non-conducting, and remains in this direction until CR2 is again rendered conducting. Thus it will be understood that the oscillations in the load circuit continue and are unaffected by the successive charging of the capacitor C1. At a later instant CR2 is again rendered conducting and the sequence of operations is repeated. Hence, it will be understood that a number of cycles of oscillation of the circuit C2L2 are completed between the applications of successive triggering signals to the controllable rectifier means CR2, and the period of time afforded to CR2 in which to become fully turned off can be well in excess of the period of the output oscillations.

The components C3 and L4 as mentioned above merely comprise a filter between the direct current supply and the inverter which prevents high frequency components of current being drawn from the supply. The inverter itself may tolerate a considerable degree of voltage ripple at its input terminals and the size of the capacitor C3 which is required for the filter is, therefore, not unduly large and may for example be of the order of size of C1.

For a given triggering frequency of the controllable rectifier means in the inverter circuit, the degree of modulation of the output waveform which appears across the inductance L2, depends upon the loading on the circuit. Hence, for a load of high-Q, the decay in amplitude between successive output oscillations may be insignificant, but for a low-Q circuit, the output oscillations may fall to a relatively low level between the instants when the controllable rectifier device CR2 is rendered conducting to apply bursts of energy to the tuned output circuit. It will be understood therefore, that the maximum frequency which can be obtained from the circuit arrangement is dependent upon the Q of the output circuit.

In some circumstances it may be that the required output frequency, the required degree of modulation and the Q factor of the output circuit are such that the controllable rectifier triggering frequency is so high as to give an unacceptably short period in which the controllable rectifier CR1 and CR2 can recover to the fully turned off condition. In this case the circuit arrangement of FIG. 1, may be modified to provide the desired frequency of operation irrespective of the Q factor of the load and the degree of modulation. This can be achieved by employing an appropriate number of additional controllable rectifier means and associated components as shown in FIG. 3, for example.

Referring to FIG. 3, it will be seen that those which components correspond to comments in the circuit arrangement of FIG. 1 have been allocated the same reference numerals with distinguishing suffixes where appropriate. The tuned load circuit for example is comprised by capacitor C2 and inductance L2 as before. Four pairs of controllable rectifier devices CR11 and CR21, CR12 and CR22, CR13 and CR23 and CR14 and CR24 are provived. Each of these pairs has respective associated capacitors C11, C12, C13 and C14 corresponding to the capacitor C1 of FIG. 1 together with corresponding circuit inductances to make the circuits from the source to the capacitors and from the capacitors to the load circuit, oscillatory at the desired frequencies for operation of the circuit.

Although not shown in the drawing, a relatively small inductor may require to be connected between the common point of inductors L1 and the load circuit C2L2 in order to prevent a small unwanted forward voltage excursion across the controlled rectifiers CR21–24 during their respective recovery periods, which might otherwise occur if the Q of the load circuit exceeds a given value.

The mode of operation of the circuit shown in FIG. 3 is illustrated by the graphical illustrations of FIG. 4 in which ($a$), ($b$), ($c$), ($d$), ($e$), ($f$), ($g$) and ($h$) represent the progressive variations of voltage across CR11, CR21, CR12, CR22, CR13, CR23, CR14 and CR24 respectively. The frequency of application of triggering signals to each of the controllable rectifiers in the example envisaged is one eighth of the tuned frequency of the output circuit C2L2. The frequency at which bursts of energy are fed to the output circuit is therefore half the output frequency. The voltage waveform appearing across L2 is thus as shown at ($i$) in FIG. 4, in response to the application of triggering signals to the respective controllable rectifiers being at points as indicated at ($j$).

It will be appreciated that if the output tuned circuit frequency is 100 kilocycles per second, a recovery time for each of the controllable rectifier means CR21, CR22, CR23 and CR24 of about 35 microseconds is catered for in the above example.

Although, in the above arrangement, two cycles of the output waveform correspond to one burst of energy applied thereto, this may if desired be varied and it could, for instance, be arranged that a one for one relationship exists.

In either the circuit arrangement of FIG. 1 or the circuit arrangement of FIG. 3, control of the mean output voltage level may be achieved by controlling the frequency of application of triggering signals to the controllable rectifiers since it is found that approximately the same quantity of energy is delivered in each burst of energy to the output circuit whatever the triggering frequency.

It is to be understood, however, that for a given frequency of application of bursts of energy to the tuned output circuit, the mean output voltage level is dependent upon the load and in the limit, an unloaded output voltage is only limited in magnitude by the circuit losses. In the other extreme, the output voltage at short circuit is clearly zero. The steep voltage regulation characteristic of the circuits can again be compensated by adjustment of the frequency of application of triggering signals to the controllable rectifiers and therefore of the frequency of application of bursts of energy to the output circuit.

In one way of providing compensation for the above voltage regulation, a sample of the output load voltage can be rectified, the resulting voltage being compared with a fixed reference to produce a difference which is applied as a control signal to the trigger pulse generator which is not shown.

Similarly, in order to protect the input controllable rectifiers CR1 or CR11, CR12, CR13 and CR14 as the case may be against excessive current when the load is small or a short circuit, a current limiting arrangement may be incorporated which senses the output current and reduces the triggering signal frequency when the output current tends to exceed a predetermined value.

In certain applications of the present invention the controllable rectifier means may comprise a parallel arrangement of controllable rectifier devices which therefore are required to be rendered conducting simultaneously. In a case such as this, it is desirable to be able to provide simultaneous but isolated triggering signals. This is also true of the arrangement shown in FIG. 3 in which pairs of devices are rendered conducting simultaneously. This may be achieved by applying a "master" triggering signal to one only of the devices which are to be rendered conducting simultaneously and connecting an appropriate number of respective isolated windings on the series inductance associated with this device to the triggering electrodes of the other devices. The step voltage transient produced in the inductances on rendering the first device conducting therefore renders the other devices conducting.

In the circuit arrangements described so far, it may be observed that there is a direct current component flowing in the load. Where the load is transformer coupled to the circuit, this may be disadvantageous and in one circuit designed to reduce this disadvantage, a push-pull operation with a centre tapped transformer is proposed.

Referring to FIG. 5, which is a modification of the circuit arrangement of FIG. 1, the input filter from the D.C. supply feeds not only the circuit components CR1, L3, C1, CR2 and L1 but also a corresponding complementary group of components CR11, L31, C11, CR21 and L11. The negative supply terminal is connected to a centre tapping on the primary winding of an output transformer T1, the secondary winding of which is connected to the tuned output circuit L2 and C2. The terminals of the primary winding of T1 are connected to L1 and L11 as shown.

The operation of the circuit arrangement, starting with the rendering conducting of CR1, is substantially the same as that of the arrangement of FIG. 1, up to the point where CR2 is rendered non-conducting following the passage of a burst of energy to the oscillatory output circuit. At a suitable instant following the instant when CR1 is rendered non-conducting, CR11 has a triggering signal applied to it and it becomes conducting to charge C11 so that its lower plate is substantially more positive than the positive supply terminal and a burst of energy is at some later instant initiated to the lower half of the secondary winding of T1. Bursts of energy are thus applied alternately via CR2 and CR21 and it will be seen that since the arrangement is symmetrical there is substantially no direct current component in the output transformer.

As in the case of FIG. 1, the circuit arrangement of FIG. 5 can be modified so as to incorporate a greater, even number of pairs of controllable rectifier devices triggering means for these devices being provided to operate them one from each side of the circuit alternately so as to reduce the frequency at which any one device is operated.

Another manner in which a direct current component in the output circuit can be substantially prevented is shown in the circuit arrangement of FIG. 6. This arrangement is, in effect, a duplication of the arrangement of FIG. 1 but fed from a centre tapped supply. Again, in operation, the pairs of controllable rectifiers CR1, CR2 and CR11 and CR21 are called into operation alternanately and if desired, further pairs can be added as before to lower the frequency of operation of each.

A further embodiment of the invention employing a centre-tapped supply is illustrated in FIG. 7. In this figure, those elements which play a similar part to those of the previous circuits have been allocated the same references. Thus the direct current supply terminals are connected via a choke L4 to a pair of capacitors C31 and C32, of equal value, to provide a centre-tapped supply the centre tapping of which is connected to a single capacitor, C1. The positive terminal of this supply is connected via an inductance L3 and a controllable rectifier device, CR1, to the other terminal of C1 as also is the negative terminal of the supply via inductance L31 and a controllable rectifier CR11. Across C1 there is also connected a series circuit made up of a parallel tuned load circuit C2 and L2 as before and a parallel arrangement of inductance L1 with a series controllable rectifier CR2 and an inductance L11 with a series controllable rectifier C21. Controllable rectifiers CR2 and CR21 are moreover oppositely poled with respect to the capacitor C1. It may be understood moreover that L1 and L11 may, if desired, be replaced by a single inductance in the series circuit but this may lead to undesirably excessive rates of change of forward voltage on the controllable rectifiers.

In operation of the circuit arrangement of FIG. 7, means are provided for supplying triggering signals to the controllable rectifier devices and when CR1 is rendered conducting a resonant charging current flows in CR1 to capacitor C1. When the current tends towards the reverse swing, C1 is charged to a potential substantially higher than the positive supply terminal and CR1 is therefore reverse-biassed and becomes non-conducting. Controllable rectifier device CR11 is however forward biassed. At a later instant, controllable rectifier device CR2 is rendered conducting by a triggering signal and C1 thereby discharges resonantly in the tuned series circuit referred to above. Again, when the reverse swing is approached, CR2 becomes non-conducting the voltage across C1 having reversed so as to be positive on the plate connected to the supply centre tapping. There is a net reverse bias across CR2 in spite of the ensuing oscillations in the load circuit which are arranged to be of less magnitude than would cause forward biassing of CR2 until it has had time fully to turn off. At a later instant, CR11 is rendered conducting and C1 is then charged resonantly such as to increase the positive potential on the plate connected to the supply centre tapping and on the tendency for the reverse swing, CR11 becomes non-conducting. At a later instant, CR21 is rendered conducting and C1 discharges resonantly in the series circuit to leave C1 charged in the opposite sense when CR21 again becomes non-conducting. A further burst of energy is thus supplied to the load circuit to maintain the oscillations therein but again, the oscillations do not overcome the reverse bias imposed by C1. The cycle of operations is subsequently repeated by CR1 again becoming conducting to increase the charge on C1.

It will be appreciated that for the purposes of the circuit arrangement of FIG. 7, the driving circuit for providing triggering signals to CR1, CR2, CR11 and CR21 should be designed to render CR1 conducting as soon as CR2 has become non-conducting and to render CR11 conducting as soon as CR21 has become nonconducting. This enables the greatest reverse recovery time to be provided for CR1 and CR11.

If it is arranged that CR1 and CR21 are rendered conducting simultaneously and CR11 and CR2 are rendered conducting simultaneously a somewhat different mode of operation which appears to have no particular advantages over the above mode of operation can be effected. This different mode of operation arises out of the fact that under these operating conditions the two resonant circuits in each case become inter-dependent but this mode of operation will not be discussed further.

Again, the basic circuit arrangement of FIG. 7 may, if desired, be extended by providing further circuits with further capacitors such as C1 for supplying bursts of energy to the tuned output circuit comprising L2 and C2 the elements, L4, C31 and C32 being common to all circuits, so as to provide greater recovery times for the controllable rectifiers in each case.

The waveforms shown in FIG. 8 represent typical voltages present in normal operation of the circuit arrangement of FIG. 7. The voltage across C1 is represented at (*a*); the voltages across CR1 and CR2 are shown at (*b*) and (*c*) respectively and the output voltage is represented at (*d*). The voltages across CR11 and CR21 are, of course, substantially the same as for CR1 and CR2 respectively with appropriate phase displacement.

As compared with the basic circuit arrangements of FIG. 1 or 3, circuit arrangements based on that of FIG. 7 have certain substantial advantages. Firstly, the peak voltages developed across the first controllable rectifiers CR1 and CR11 are substantially smaller owing principally to the supply being centre-tapped. The power handling capacity for each such controllable rectifier device is also improved. The other controllable rectifiers, of course, handle substantially the same voltage for a given output.

A second advantage pertains from the fact that, as seen from FIG. 8, the normal reverse blocking voltage on CR1 and CR11 is only a small proportion of the peak forward blocking voltage. The size of suppression components which may be required therefore to limit the reverse carrier storage transients in these controllable rectifiers to the same level as the peak forward voltage may be smaller than otherwise would be the case.

Similarly, difficulties arising out of differing carrier storage characteristic of controllable rectifier devices, when reverse voltage sharing is to be achieved in the case when a number of devices are connected in series, are also reduced.

A third advantage is connected with the output voltage regulation and the off-load circulating currents in the circuit. In the circuit arrangement of FIG. 1, for example, the output voltage as already indicated is highly dependent upon the load and the effect of reducing the load Q-factor is to reduce the input current. Theoretically, therefore, with the circuit of FIG. 1, a load of infinite Q-factor would, in the absence of control of the frequency at which the controllable rectifiers are operated, cause an ever increasing current to be drawn from the supply and the voltages in the various parts of the circuit would increase correspondingly. In the circuit arrangement of FIG. 7, however, the regulation with load variation at a given frequency of operation of the controllable rectifier devices is considerably improved. The supply of energy to the circuit of FIG. 7 increases with the load and such a build up of voltage or current does occur, the input current and voltages under light load or short-circuit conditions being less than those under load conditions.

A fourth advantage of the arrangement of FIG. 7 rests in that for a given frequency of supply of bursts of energy to the tuned output circuit, the fundamental frequency of the voltage waveform appearing across the storage capacitor C1, in FIG. 7, is half that in the case, say, of FIG. 1. For a given output voltage, the amplitude of the alternating current component of voltage is not substantially increased and the peak voltage is the same, so that in the circuit of FIG. 7, the R.M.S. current in C1 is reduced substantially. The overall rating of C1 to be saved is therefore significant.

Although in the circuit arrangements described in the foregoing, all the switching devices employed have been envisaged as being controllable rectifier devices, it is feasible to employ other forms of device. Hence, in the circuit arangement shown in FIG. 9 the circuit of FIG. 7 has been modified to employ a saturable reactor switching device via which bursts of energy are supplied to the tuned output circuit. Saturable reactors may also replace the corresponding controllable rectifiers in the other circuit arrangements already described.

Considering now by way of example, the operation of the circuit arrangement of FIG. 9; at the instant when the controllable rectifier CR1 is rendered conducting, capacitor C1 is charged resonantly as before from C31. At the instant CR1 becomes non-conducting, C1 is left with its right hand plate at a potential more positive than the supply positive. The voltage across C1 then appears across the saturable reactor SR and the unsaturated impedance of the latter is relatively high to prevent appreciable discharge of C1 at this time. It may be noted further that under steady running conditions, the high frequency voltage in the output circuit also assists the blocking voltage presented by SR. After a period to be determined principally by the characteristics of SR, SR becomes saturated and the capacitor C1 is then discharged via the relatively low impedance of SR into the output resonance circuit. The voltage on C1 then overswings, current continuing to flow in SR. When, however, the current through C1 begins to reverse, the current in SR subsequently reduces to zero and SR becomes unsaturated thereby again presenting a high impedance to prevent substantial discharge at this time of C1 in the opposite direction. The second controllable rectifier CR11 is then rendered conducting and the charge on C1 is supplemented by resonant discharge from C32 and CR11 again becomes non-conducting. Again, after a time, dependent principally on the characterstics of SR, the latter becomes saturated to allow C1 to discharge into the resonant output circuit and the sequence of operations repeats itself. Some typical waveforms to be obtained with a circuit arrangement such as that of FIG. 9 are shown in FIG. 10. In this figure, the voltage across C1 is represented at (*a*); the voltage across CR1 is represented at (*b*); the voltage across SR is represented at (*c*) and the output voltage is represented at (*d*). Clearly, the voltage across CR11 is similar to that across CR1 but phase displaced therefrom.

In the circuit arrangement of FIG. 11, there is shown one form of circuit for producing triggering signals for the controllable rectifier in the circuit arrangement of FIG. 9. It will be seen from FIG. 11 that the triggering signals are generated with reference to the voltage appearing across the saturable reactor and for this purpose, SR is provided with a centre-tapped secondary winding. The terminals of this winding are connected via blocking rectifiers D1 and D2 to the base circuits of a pair of transistors TR1 and TR2 arranged in a bistable circuit. Outputs from these transistors are resistance-capacity coupled to the base electrodes of further respective transistors TR3 and TR4, the collector circuits of which are transformer coupled to the controllable rectifiers CR1 and CR11 respectively. When the terminal A of the secondary winding of SR is negative, TR1 becomes conducting and TR2 non-conducting to cause an output current pulse to be produced to gate the controllable rectifier associated with TR4. When similarly, the terminal B becomes negative, a current pulse is produced to gate the controllable rectifier which is associated with TR3. Starting of the circuit is achieved by a switch S which when operated causes the state of the bistable circuit to reverse.

It will be appreciated that whereas the maximum voltage of operation of the circuit arrangements, using controllable rectifiers only, may be limited by the fact that in practice it is not convenient to employ series controllable rectifiers with voltage sharing components in the series circuit which supplies bursts of energy to the load circuit, by employing a saturable reactor for this purpose, the limitation is largely removed, it only then being necessary to use series controllable rectifiers in the resonant circuits which feed the storage capacitor or capacitors such as C1.

Another feature of circuits described above when saturable reactors are employed is that not only can be reverse bias time afforded for the controllable rectifiers be made of adequate duration by employing the appropriate number of circuits, for supplying bursts of energy to the load circuit, by operating in turn, but also excessive rates of rise of anode voltage on the controllable rectifiers can be avoided. Such excessive rates of rise of anode voltage could, if not prevented, cause the devices in question to become conducting at the wrong times for correct operation of the circuits. This is prevented by, as mentioned before, using a number of circuits to be operated in turn, at the same time making the input capacitors small compared with the storage capacitances such as C1. The triggering signals are so arranged moreover that when the saturable reactor such as SR of one circuit becomes non-conducting, which tends to produce a high rate of change of voltage at (say) the cathode of a given controllable rectifier, a corresponding controllable rectifier in another of the circuits is triggered simultaneously so as to cause a rapid discharge of the input filter capacitance and a rapid change of voltage at (say) the anode of the same controllable rectifier. The rapid rate of change of net forward potential on this controllable rectifier is, therefore, substantially reduced and the forward buildup of voltage is determined by the recharging of the input filter capacitance.

Circuit arrangements such as described herein according to the invention can, if desired, be employed for direct frequency changing purposes to change a low frequency supply into a high frequency output. One such circuit arrangement for converting a three phase supply and based on the circuit arrangement of FIG. 9, is shown in FIG. 12. It will be seen in FIG. 12, that a pair of input controllable rectifiers is provided for each input phase together with respective input filter components to prevent a high frequency component being drawn from the supply.

In operation, the pair of input controllable rectifiers connected to the most positive and the most negative supply points at a given period is arranged to provide a succession of alternately poled high frequency charging current pulses to the capacitor C1 over that given supply period the operative pair then being charged as the input voltages vary such that others take over. The junction of the input capacitors may be regarded as a substantially constant voltage point if the capacitors are sufficiently large. For maximum output voltage therefore, the input controllable rectifiers can be operated over periods of the input supply cycle during which the supply phase connected thereto is of the maximum voltage and by displacing the periods over which the input controllable rectifier devices are operative the output voltage may if desired be varied.

Although in the foregoing, the circuit arrangements described have been assumed to be supplying an inductive load, they may equally well supply other types of load. A resistive load may, for example, be connected directly across the tuned output circuit. Alternatively, the tuned output circuit may be replaced by a resistance load in which case bursts of energy would be applied thereto for every half cycle of the output voltage to maintain the high frequency output.

Having thus described my invention what I claim is:

1. An inverter or converter circuit for generating from a supply source a continuous alternating current in a load circuit including two input terminals and a storage capacitor, first switching means connected to the storage capacitor and the input terminals and intermittently operable from a high impedance condition to a low impedance condition for charging the capacitor from the input terminals, two output terminals and a resonant output circuit connected to said output terminals, second switching means being connected to said storage capacitor and to the output terminals and operable from a high impedance condition to a low impedance condition whilst the said first switching means is in a high impedance condition for providing a discharge path for the unidirectional transfer of charge from the storage capacitor to the resonant output circuit, means for controlling the condition of said switching means, the operating frequency of the first and second switching means being lower than the resonant frequency of the resonant output circuit and phased therewith to cause the maintenance of alternating current of the resonant frequency in the load circuit, the output circuit including a transformer having a push pull input winding, said output terminals being connected across one section of said input winding to induce current flow in one direction therein, the circuit including a further capacitor and further first switching means connected between said further capacitor and the input terminals, the further first switching means being operable intermittently from a high impedance condition to a low impedance condition to charge the further capacitor from the input terminals, further second switching means being connected between the further capacitor and another section of the transformer windings and operable from a high impedance condition to a low impedance condition whilst the first further switching means is in its high impedance condition to provide a discharge path from the further capacitor to the latter section of the transformer winding, the switching means being designed so that the two capacitors push pull discharge into the resonant output circuit.

2. An inverter or converter circuit for generating from a supply source a continuous alternating current in a load circuit including two input terminals and a storage capacitor, first switching means connected to the storage capacitor and the input terminals and intermittently operable from a high impedance condition to a low impedance condition for charging the capacitor from the input terminals, two output terminals and a resonant output circuit connected to said output terminals, second switching means being connected to said storage capacitor and to the output terminals and operable from a high impedance-condition to a low impedance condition whilst the said first switching means is in a high impedance condition for providing a discharge path for the unidirectional transfer of charge from the storage capacitor to the resonant output circuit, means for controlling the conduction of said switching means, the operating frequency of the first and second switching means being lower than the resonant frequency of the resonant output circuit and phased therewith to cause the maintenance of alternating current of the resonant frequency in the load circuit, said input terminals being connected to a source of charge of one polarity and the circuit including further input terminals formed by the said two input terminals and a center-tap connected across said input terminals connected to a source of opposite polarity, a further storage capacitor and a further first switching means connected between the further input terminals and the further capacitor the further first switching means being intermittently operable from a high impedance condition to a low impedance condition to charge the further capacitor from the further input terminals, further second switching means connected between the further capacitor and the resonant output circuit operable from a high impedance condition to a low impedance condition whilst the further first switching means is in its high impedance condition to provide a discharge path for the unidirectional transfer of charge from the further storage capacitor to the resonant output circuit.

3. An inverter or converter circuit for generating from a supply source a continuous alternating current in a load circuit including two input terminals and a storage capacitor, first switching means connected to the storage capacitor and the input terminals and intermittently operable from a high impedance condition to a low impedance condition for charging the capacitor from the input terminals, two output terminals and a resonant output circuit connected to said output terminals, second switching means being connected to said storage capacitor and to the output terminals and operable from a high impedance-condition to a low impedance condition whilst the said first switching means is in a high impedance condition for providing a discharge path for the unidirectional transfer of charge from the storage capacitor to the resonant output circuit, means for controlling the conduction of said switching means, the operating frequency of the first and second switching means being lower than the resonant frequency of the resonant output circuit and phased therewith to cause the maintenance of alternating current of the resonant frequency in the load circuit, said input terminals being connected to a source of charge of one polarity and the circuit including further input terminals formed by the said two input terminals and a center-tap connected across said input terminals connected to a source of charge of opposite polarity with further first switching means connected between the further input terminals and the storage capacitor, the further first switching means being operable from a high impedance condition to a low impedance condition following discharge of the capacitor via the second switching means for charging the capacitor with the opposite polarity and further second switching means connected between the capacitor and the output circuit, the further second switching means being operable from a high impedance condition to a low impedance condition following charging of the capacitor to said opposite polarity to provide a discharge path for the unidirectional transfer of charge from the capacitor to the resonant output circuit.

4. An inverter or converter circuit as claimed in claim 3, the second switching means and the further second switching means being combined as a single saturable reactor the characteristics of which are so chosen that the saturated, low impedance condition of the saturable reactor following charging of the capacitor occurs between charging of the capacitor to one polarity via one first switching means and recharging of the capacitors to the other polarity via the other first switching means.

5. An inverter or converter circuit as claimed in claim 4 including means for sensing the variation of voltage across the saturable reactor for producing signals for operating the first switching means at appropriate instants.

6. A circuit as claimed in claim 4, the first switching means embodying semiconductor controllable rectifier devices of a type which are rendered conducting on application of a triggering signal thereto and subsequently become non-conducting when the voltage across them tends to reverse for a sufficient time for the devices to regain their forward blocking capability.

7. An inverter or converter circuit for generating from a supply source of continuous alternating current in a load circuit including two input terminals and a storage capacitor, first switching means connected to the storage capacitor and to the input terminals, an inductance being included in the path via the switching means between the storage capacitor and the input terminals and the first switching means being intermittently operable from a high impedance condition to a low impedance condition for charging the capacitor from the input terminals, two output terminals and a resonant output circuit connected to said output terminals, second switching means being connected to said storage capacitor and the output terminals, an inductance being included in the path via the second switching means from the capacitor and the output terminals and the second switching means being operable from a high impedance condition to a low impedance condition whilst the said first switching means is in a high impedance condition for providing a discharge path for the unidirectional transfer of charge from the storage capacitor to the resonant output circuit, means for controlling the conduction of said switching means the operating frequency of the first and second switching means being lower than the resonant frequency of the resonant output circuit and phased therewith to cause the maintenance of alternating current of the resonant frequency in the low circuit, the output circuit including a transformer having a push pull input winding, said output terminals being connected across one section of said winding to induce current flow in one direction therein, the circuit also including a further capacitor and further first switching means connected between said further capacitor and the input terminals, with inductance included in the path between the input terminals and the further capacitor via the further first switching means, the further first switching means being operable intermittently from a high impedance condition to a low impedance condition to charge the further capacitor from the input terminals, further second switching means being connected between the further capacitor and another section of the transformer winding and inductance being included in the path via the further second switching means from the capacitor to the latter section of the transformer winding, the further second switching means being operable from a high impedance condition to a low impedance condition whilst the further first switching means is in its high impedance condition to provide a discharge path from the further capacitor to the latter section of the transformer winding, the switching means being designed so that the two capacitors push pull dicharge into the resonant output circuit.

8. An inverter or converter circuit for generating from a supply source a continuous alternating current in a load circuit including two input terminals and a storage capacitor, first switching means connected to the storage capacitor and to the input terminals an inductance being included in the path via the switching means between the storage capacitor and the input terminals and the first switching means being intermittently operable from a high impedance condition to a low impedance condition for charging the capacitor from the input terminals, two output terminals and a resonant output circuit connected to said output terminals, second switching means being connected to said storage capacitor and the output terminals, an inductance being included in the path via the second switching means from the capacitor and the output terminals and the second switching means being operable from a high impedance condition to a low impedance condition whilst the said first switching means is in a high impedance condition for providing a discharge path for the unidirectional transfer of charge from the storage capacitor to the resonant output circuit, means for controlling the conduction of said switching means the operating frequency of the first and second switching means being lower than the resonant frequency of the resonant output circuit and phased therewith to cause the maintenance of alternating current of the resonant frequency in the low circuit, said input terminals being connected to a source of charge of one polarity and the circuit including further input terminals formed by the said two input terminals and a center-tap connected across said input terminals connected to a source of charge of opposite polarity, a further storage capacitor and further switching means connected between the further input terminals and the further capacitor, inductance being included in a path from the further source and the further capacitor via the further first switching means and the further first switching means being intermittently operable from a high impedance condition to a low impedance condition to charge the further capacitor from the further input terminals, further second switching means connected between the further capacitor and the resonant output circuit and inductance being included in the path via the further second switching means between the further capacitor and the resonant output circuit, the further second switching means being operable from a high impedance condition to a low impedance condition whilst the further first switching means is in its high impedance condition to provide a discharge path for the unidirectional transfer of charge from the further storage capacitor to the resonant output circuit.

9. An inverter or converter circuit for generating from a supply source a continuous alternating current in a load circuit including two input terminals and a storage capacitor, first switching means connected to the storage capacitor and to the input terminals an inductance being included in the path via the switching means between the storage capacitor and the input terminals and the first switching means being intermittently operable from a high impedance condition to a low impedance condition for charging the capacitor from the input terminals, two output terminals and a resonant output circuit connected to said output terminals, second switching means being connected to said storage capacitor and the output terminals, an inductance being included in the path via the second switching means from the capacitor and the output terminals and the second switching means being operable from a high impedance condition to a low impedance condition whilst the said first switching means is in a high impedance condition for providing a discharge path for the unidirectional transfer of charge from the storage capacitor to the resonant output circuit, means for controlling the conduction of said switching means the operating frequency of the first and second switching means being lower than the resonant frequency of the resonant output circuit and phased therewith to cause the maintenance of alternating current of the resonant frequency in the low circuit, said input terminals being connected to a source of charge of one polarity and the circuit including further input terminals formed by the said two input terminals and a center-tap connected across said input terminals connected to a source of charge of the opposite polarity with further first switching means connected between the further input terminals and the storage capacitor, inductance being included in the path via the further first switching means from the further input terminals to the storage capacitor, the further first switching means being operable from a high impedance condition to a low impedance condition following discharge of the capacitor via the second switching means for charging the capacitor with the opposite polarity and further second switching means connected between the capacitor and the output circuit, inductance being included in the path between the capacitor and the output circuit via the further second switching means and the further second switching means being operable from a high impedance condition to a low impedance condition following charging of the capacitor to said opposite polarity to provide a discharge path for the unidirectional transfer of charge from the capacitor to the resonant output circuit.

10. An inverter or converter circuit as claimed in claim 9, the second switching means and the further second switching means being combined as a single saturable reactor the characteristics of which are so chosen that the saturated, low impedance condition of the saturable reactor following charging of the capacitor occurs between charging of the capacitor to one polarity via one first switching means and recharging of the capacitor via the other first switching means to the other polarity.

11. An inverter or converter circuit for converting a polyphase alternating current supply into an alternating current supply of substantially higher frequency including two output terminals with a resonant output circuit connected thereto, a plurality of storage capacitors and a second switching means connecting each storage capacitor to the output terminals, there being provided for each phase of the alternating current supply respective first switching means which are connected to be operable from a high impedance condition to a low impedance condition to connect the respective phase of the supply during respective half cycles thereof to one of the said storage capacitors, each second switching means being operable from a high impedance condition to a low impedance condition following charging of its respective storage capacitor from the supply to provide a discharge path for the transfer of charge from the capacitor to the output circuit to maintain an alternating current therein whose frequency is the resonant frequency of the output circuit.

References Cited

UNITED STATES PATENTS

| | | | |
|---|---|---|---|
| 2,451,189 | 10/1948 | Alexanderson et al. | 321—7 |
| 2,465,407 | 3/1949 | Varela | 331—165 X |
| 2,721,265 | 10/1955 | Rothman et al. | 331—166 |
| 2,727,159 | 12/1955 | Sunderlin. | |
| 3,015,739 | 1/1962 | Manteuffel | 307—88.5 |
| 3,120,633 | 2/1964 | Genuit | 321—45 |
| 3,147,419 | 9/1964 | Cope | 307—88.5 X |
| 3,199,036 | 8/1965 | Bruant et al. | 328—67 |
| 3,207,974 | 9/1965 | McMurray | 321—45 |
| 3,214,672 | 10/1965 | Watkins | 321—45 X |
| 3,214,707 | 10/1965 | Wuerker | 331—128 |
| 3,243,729 | 3/1966 | Olson et al. | 331—117 |

FOREIGN PATENTS

| | | | |
|---|---|---|---|
| 654,989 | 7/1951 | Great Britain | 331—128 |

ROY LAKE, *Primary Examiner.*

J. B. MULLINS, *Assistant Examiner.*